United States Patent
Dean et al.

(10) Patent No.: US 9,341,724 B2
(45) Date of Patent: May 17, 2016

(54) SWEEP SEQUENCE DETERMINATION FOR OVERLAPPING SWEEPS

(75) Inventors: Timothy James Dean, Shenton Park (AU); Kambiz Iranpour, Oslo (NO); Pieter Leonard Vermeer, Horsham (GB); Claudio Bagaini, Cottenham (GB)

(73) Assignee: WesternGeco L.L.C., Houston, TX (US)

( * ) Notice: Subject to any disclaimer, the term of this patent is extended or adjusted under 35 U.S.C. 154(b) by 1029 days.

(21) Appl. No.: 13/427,363

(22) Filed: Mar. 22, 2012

(65) Prior Publication Data

US 2013/0250723 A1 Sep. 26, 2013

(51) Int. Cl.
*G01V 1/36* (2006.01)
*G01V 1/00* (2006.01)

(52) U.S. Cl.
CPC ............... *G01V 1/005* (2013.01); *G01V 1/366* (2013.01); *G01V 2210/32* (2013.01)

(58) Field of Classification Search
CPC .... G01V 1/005; G01V 1/366; G01V 2210/32
See application file for complete search history.

(56) References Cited

U.S. PATENT DOCUMENTS

| | | | |
|---|---|---|---|
| 3,388,373 A * | 6/1968 | Prebish | 367/5 |
| 4,168,485 A * | 9/1979 | Payton et al. | 367/41 |
| 6,535,818 B1 | 3/2003 | Baeten | |
| 6,545,944 B2 * | 4/2003 | de Kok | 367/56 |
| 6,704,245 B2 * | 3/2004 | Becquey | 367/39 |
| 7,050,356 B2 | 5/2006 | Jeffryes | |
| 7,859,945 B2 | 12/2010 | Sallas et al. | |
| 7,916,576 B2 * | 3/2011 | Beasley et al. | 367/38 |
| 8,054,711 B2 * | 11/2011 | Laake | 367/45 |
| 8,238,199 B2 * | 8/2012 | Elder et al. | 367/80 |
| 8,559,270 B2 * | 10/2013 | Abma | 367/38 |
| 8,619,497 B1 * | 12/2013 | Sallas et al. | 367/23 |

(Continued)

FOREIGN PATENT DOCUMENTS

WO 2008025986 A1 3/2008

OTHER PUBLICATIONS

Mathbits.com Random Number Generator. http://mathbits.com/MathBits/CompSci/LibraryFunc/rand.htm, cached by Wayback Machine on Mar. 5, 2008. https://web.archive.org/web/20080305223454/http://mathbits.com/MathBits/CompSci/LibraryFunc/rand.htm.*

(Continued)

*Primary Examiner* — Ari M Diacou

(57) ABSTRACT

An embodiment of the invention includes combining pseudorandom sweeps with an independent, or nearly independent, survey acquisition technique. Targeted design of pseudorandom sweeps can direct the majority of cross-correlation noise to lie outside key time-lags of the record (i.e., windows of interest). Embodiments of the invention are described herein.

20 Claims, 11 Drawing Sheets

(56) References Cited

U.S. PATENT DOCUMENTS

| | | |
|---|---|---|
| 2007/0030760 A1* | 2/2007 | Laake .................... 367/41 |
| 2007/0195644 A1* | 8/2007 | Marples et al. ........... 367/39 |
| 2008/0232194 A1* | 9/2008 | Jeffryes ............ G01V 1/005 367/38 |
| 2009/0010103 A1 | 1/2009 | Sallas et al. |
| 2009/0052278 A1 | 2/2009 | Iranpour et al. |
| 2009/0076730 A1* | 3/2009 | Johnson et al. .......... 702/13 |
| 2009/0251994 A1* | 10/2009 | Rouquette ............... 367/41 |
| 2010/0020640 A1 | 1/2010 | Eick et al. |
| 2010/0097888 A1* | 4/2010 | Neelamani et al. ........ 367/53 |
| 2012/0033525 A1* | 2/2012 | Abma et al. ............. 367/20 |
| 2012/0147699 A1* | 6/2012 | Dellinger et al. ......... 367/15 |
| 2012/0147701 A1* | 6/2012 | Ross et al. .............. 367/23 |

OTHER PUBLICATIONS

Allen, et al., "High Fidelity Vibratory Seismic (HFVS) Method for Acquiring Seismic Data", SEG Annual Meeting, New Orleans, Louisiana, 1998, pp. 140-143.

Sagan, C., "Acquisition and Processing of Simultaneous Vibroseis Data", Geophysical Prospecting, vol. 58(1), 2010, pp. 81-99.

Rozemond, H., "Slip-Sweep Acquisition", 66th Annual International SEG Meeting, 1996, pp. 64-67.

Sallas, et al., "Broadband Vibroseis Using Simultaneous Pseudorandom Sweeps", SEG Annual Meeting, Las Vegas, Nevada, 2008, pp. 100-104.

* cited by examiner

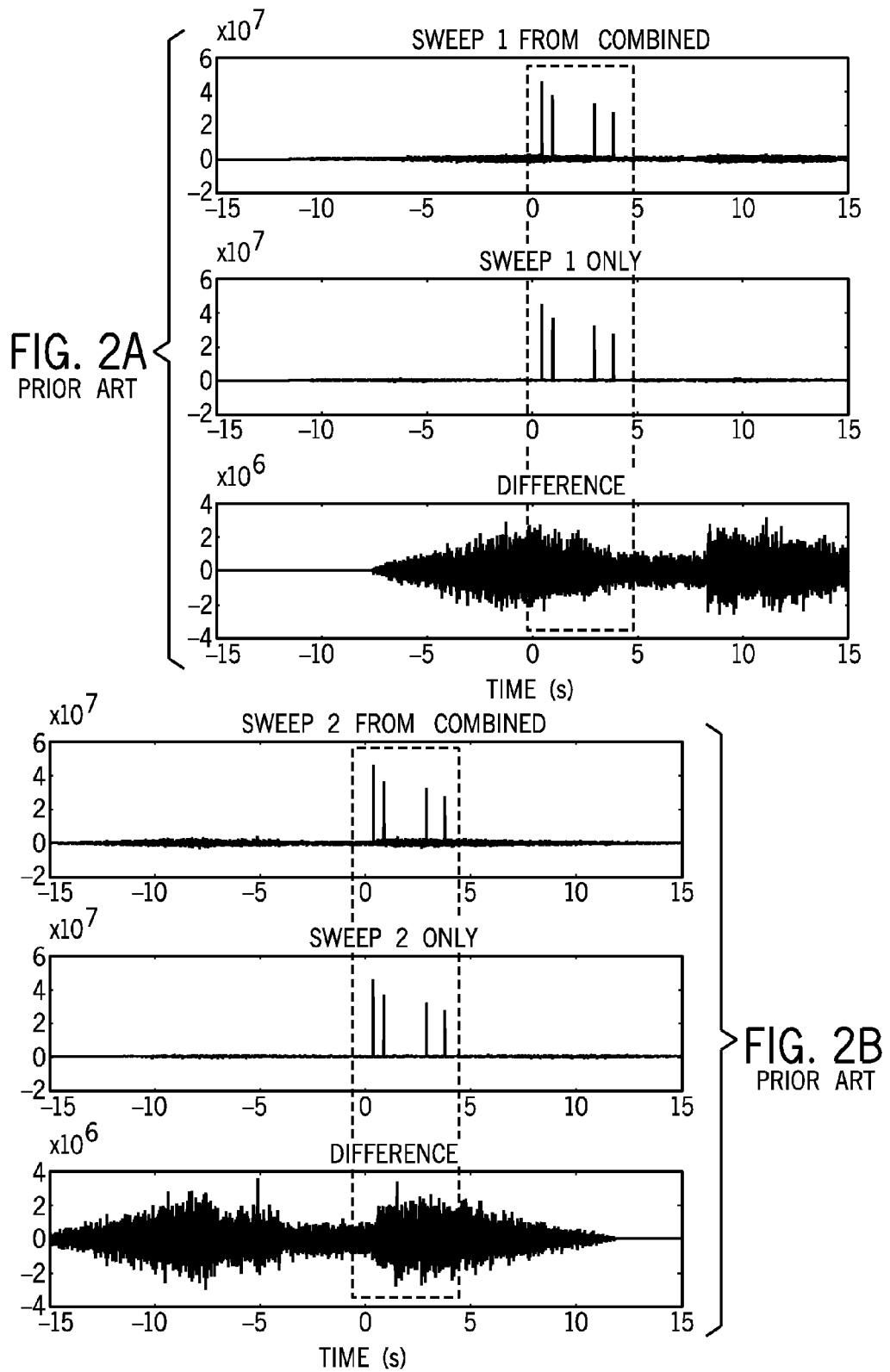

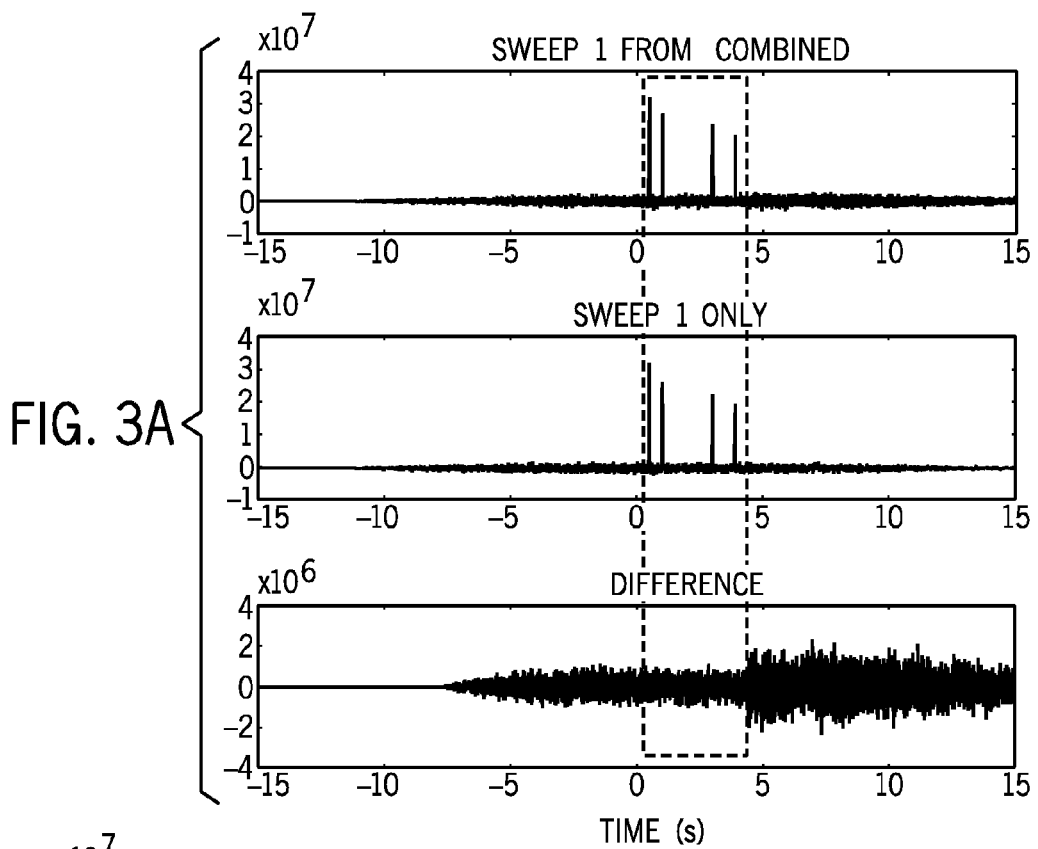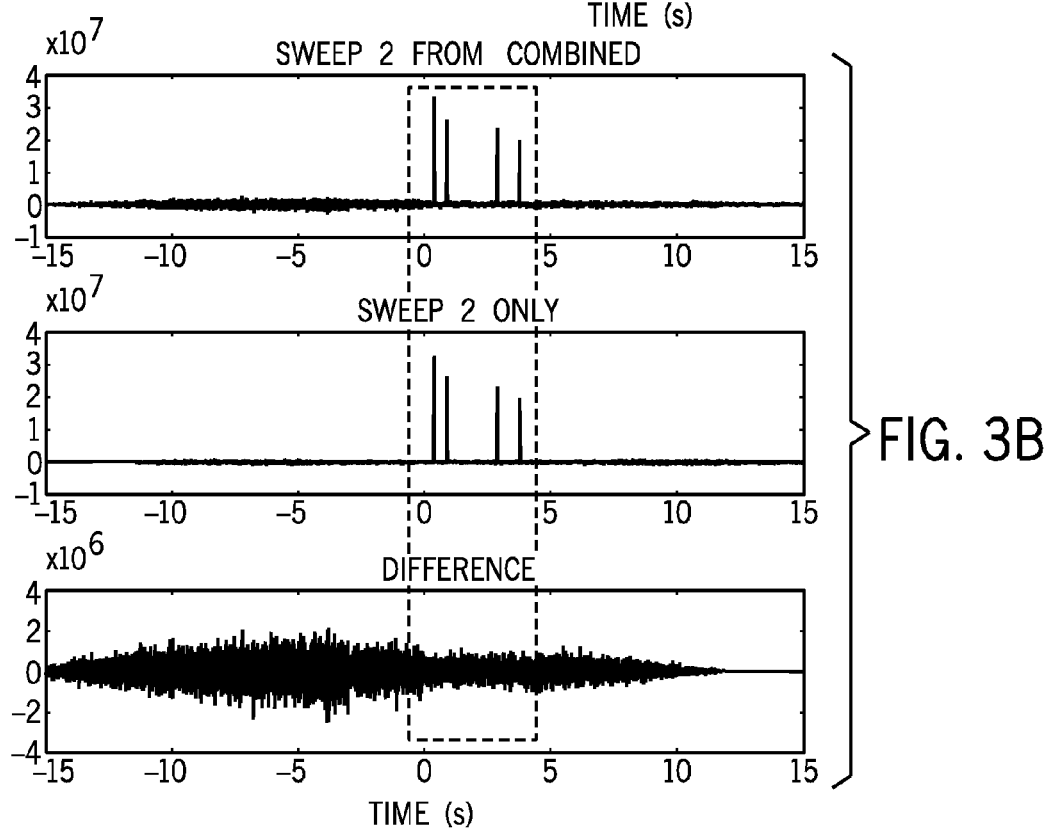

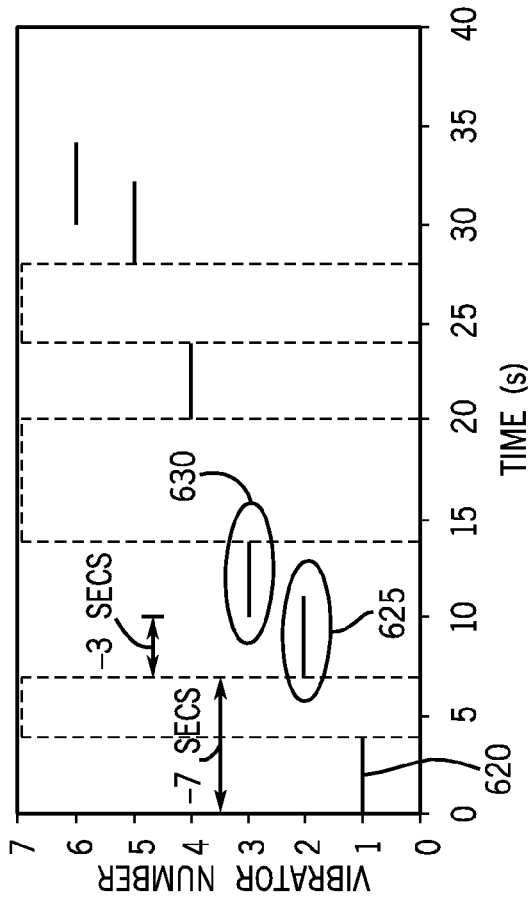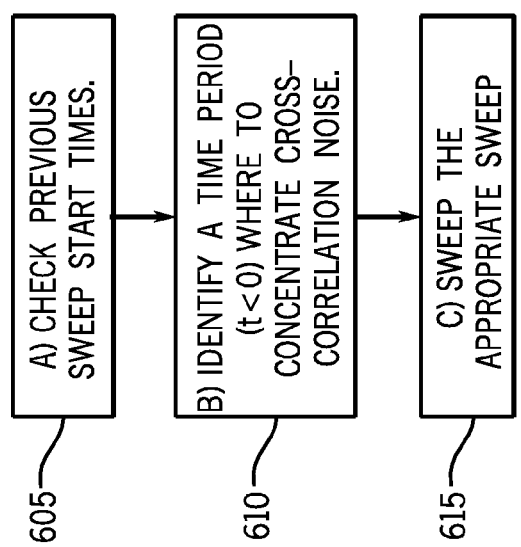
FIG. 6

SWEEP SEQUENCE DETERMINATION FOR OVERLAPPING SWEEPS

BACKGROUND

Simultaneous source techniques involve multiple sources (e.g., vibrators) or groups of sources emitting sweeps simultaneously. The resulting seismic record is then separated to obtain records that contain the contribution from only a single vibrator.

Methods for record separation include, for example, simultaneous sweep methods that use a phase rotation scheme for the different sweeps, High Fidelity Vibratory Seismic (HFVS) techniques, and pseudorandom sequence-based sweeps that enhance record separation by minimizing sweep crosscorrelation in an area of interest.

One pseudorandom sequence-based method involves generating a series of codes that are iteratively altered to reduce the sweep crosscorrelation for the time of interest in the correlated record (e.g., from t=0 to between t=2 and t=10 seconds). A second pseudorandom sequence-based method involves using an evolutionary technique (e.g., simulated annealing or genetic algorithm) to generate sweeps that have their crosscorrelation minimized at certain lag-times.

These record separation techniques are effective but must be balanced with the need to efficiently gather seismic data. Efficient survey methods may involve vibrators operating independently of one another with their sweeps occurring at random intervals. Such methods increase survey productivity (other methods require vibrators to wait for other vibrators to finish sweeping before they begin sweeping) but may preclude use of the aforementioned record separation techniques (which may require high amounts of organization between the different sources).

BRIEF DESCRIPTION OF THE DRAWINGS

Features and advantages of embodiments of the present invention will become apparent from the appended claims, the following detailed description of one or more example embodiments, and the corresponding figures, in which:

FIGS. 1 and 2A-B include survey data associated with prior art survey techniques.

FIGS. 3A-B include embodiments for crosscorrelation noise minimization.

FIG. 6 includes a schematic flow chart in an embodiment.

DETAILED DESCRIPTION

In the following description, numerous specific details are set forth but embodiments of the invention may be practiced without these specific details. Well-known circuits, structures and techniques have not been shown in detail to avoid obscuring an understanding of this description. "An embodiment," "various embodiments" and the like indicate embodiment(s) so described may include particular features, structures, or characteristics, but not every embodiment necessarily includes the particular features, structures or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner. "Connected" may indicate elements are in direct physical or electrical contact with each other and "coupled" may indicate elements co-operate or interact with each other, but they may or may not be in direct physical or electrical contact. Also, while similar or same numbers may be used to designate same or similar parts in different figures, doing so does not mean all figures including similar or same numbers constitute a single or same embodiment.

An embodiment of the invention includes combining pseudorandom sequence-based sweeps with an independent, or nearly independent, survey acquisition technique. Targeted design of pseudorandom sweeps can direct the majority of cross-correlation noise to lie outside key time-lags of the record (i.e., windows of interest).

Figure 1:
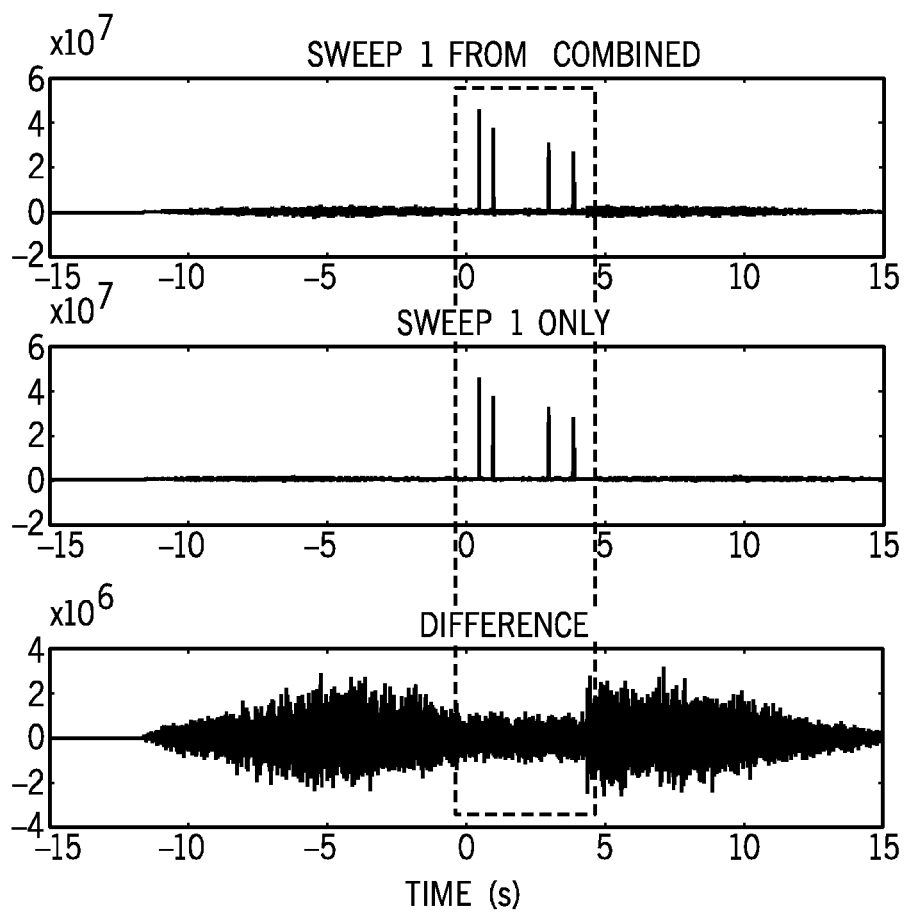

FIG. 1 includes survey data associated with a prior art survey technique that minimizes crosscorrelation noise in the correlated data from t=0 to between t=2 and t=10 seconds. FIG. 1 includes a single-trace synthetic record consisting of four reflections at 0.5, 1, 3 and 3.9 seconds. A modeled record for two 12 second pseudorandom sweeps, which start sweeping at the same time, was generated using the reflectivity sequence reflections. The auto-correlation of each sweep is responsible for the noise, which may include data other than the four spikes corresponding to the positions of the four reflectors (see middle plot). The sweeps were created and modified using a simulated annealing process to minimize their cross-correlation in a window (see dashed box) that ranges from t=0 to t=4. The top plot shows the correlation of the combined signal (combination of sweeps 1 and 2) after correlation with sweep 1. The middle plot shows the correlation of the contribution from vibrator 1 (but not vibrator 2) with sweep 1 (i.e., the result as if only sweep 1 were being used). The bottom plot is the difference between the top and middle plots. As shown in the bottom plot, the pseudorandom sweeps have minimized the cross-correlation noise in the time range of interest (shown by the dashed box), which includes the four reflections. The cross-correlation level in the time range of interest could be further decreased by, for example, applying further refining iterations during the simulated annealing process.

Before discussing other correlated plots, it should be understood that with crosscorrelated plots a multisecond sweep is collapsed so that the crosscorrelated record length essentially includes only the listening time (sometimes referred to as the "record length") associated with the sweep. Consequently, the beginning of listening time and the beginning of the associated sweep (which has been collapsed during correlation) essentially coincide in a crosscorrelated plot.

The technique of FIG. 1 is effective for sweeps that start at the same time. However, as seen in FIGS. 2A-B, when the same pseudorandom sweep generation technique is applied to data acquired with vibrators that have overlapping (i.e., simultaneous) sweeps (but which do not start at exactly the same time) the results are lacking. Specifically, the same 12 second sweeps and 4 reflections (as seen in FIG. 1) are included in FIGS. 2A-B. However, unlike FIG. 1, the sweep start times in FIGS. 2A-B differ by 4 seconds from one another with sweep 1 occurring before sweep 2. Each of sweeps 1 and 2 is designed to minimize crosscorrelation noise from t=0 to t=4 seconds. As a result (see FIG. 2A), considering sweep 2 started 4 seconds after sweep 1, the area of minimization is shifted 4 seconds to the right of the area of interest (area with 4 reflections). In other words, in the 4 second window of interest the cross-correlation noise is high and the area of minimization occurs between t=4 and t=8 seconds. Similarly, FIG. 2B illustrates how sweep 2 was designed for crosscorrelation minimization about t=0 to 4 s. As a result, considering sweep 1 started 4 seconds before sweep 2, the area of minimization is shifted 4 seconds to the left of the area of interest (area with 4 reflections). In the 4 second window of interest, the cross-correlation noise is high and the area of minimization occurs between t=−4 and t=0 seconds.

FIGS. 3A-B include survey data associated with an embodiment of the invention. Like FIGS. 2A-B, the same 4 reflections and 12 second sweeps, whose start times differ by 4 seconds, are used. However, one of the sweeps is designed so its cross-correlation minimized in a window is offset from (not centered on) its respective t=0 location. For example, FIG. 3A shows how sweep 2 was designed for crosscorrelation minimization offset from its t=0 location. As a result, when the result for sweep 1 on its own is taken out in the bottom "difference" plot one sees the minimization does not have the 4 second offset associated with the difference in start times (i.e., t=4 to t=8 seconds), but instead occurs between t=0 and t=4 seconds. When viewed from the sweep 1 context in FIG. 3B, one sees the minimization does not have the 4 second offset associated with the difference in start times (i.e., t=−4 to t=0 seconds). When sweep 2 is removed in the "difference" plot the minimization coincides with the 4 second window of interest.

Thus, as seen in FIG. 1, when two sweeps begin simultaneously one may design the sweeps to each have a minimization window of, for example, between t=0 (onset of listening period) to t=4 (end of period where reflections are expected to be seen). However, when two sweeps do not begin simultaneously one may design the sweeps to have offset minimization windows. So, FIG. 3A shows sweep 2 with an offset minimization window of t=−4 to t=0 (i.e., minimization window begins 4 seconds before sweep 2 begins). FIG. 3B shows sweep 1 with an offset minimization window of t=4 to t=8 (i.e., minimization window begins 4 seconds after sweep 1 begins).

Figure 10A:
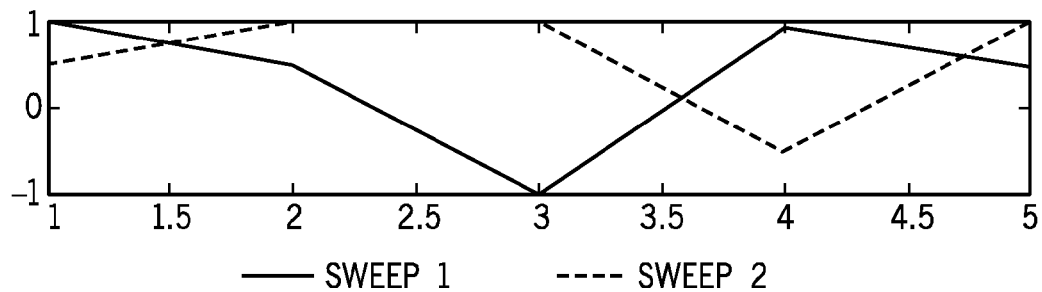
FIGS. 10A-F include embodiments for crosscorrelation noise minimization.
Figure 10B:
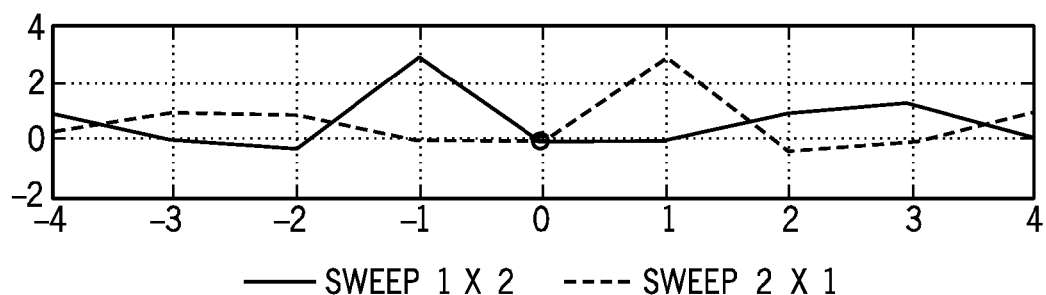
Figure 10C:
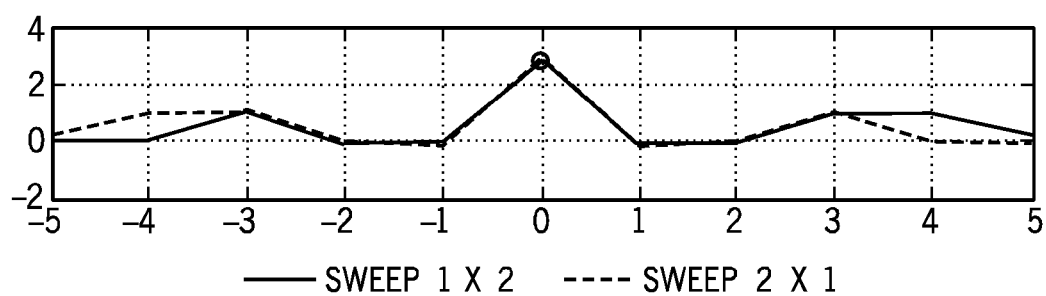

FIGS. 10A-F include another example of an embodiment for minimizing crosscorrelation noise for simultaneous sweeps. FIG. 10A shows two sweeps (sweep 1 and sweep 2) that start at the same time. The sweeps are designed to have a cross-correlation of 0 at t=0 (FIG. 10B). However, when one sweep starts 1 second later than the other sweep, then at t=0 the cross-correlation value is 3 (FIG. 10C). Thus, FIGS. 10A-C show issues with prior methods for simultaneous sweeps.

Figure 10D:
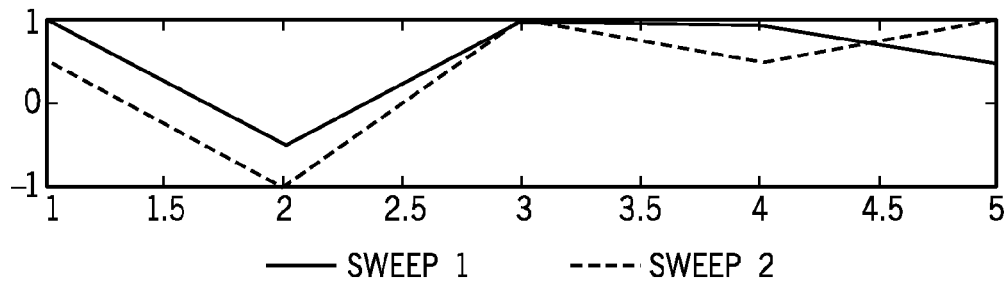
Figure 10E:
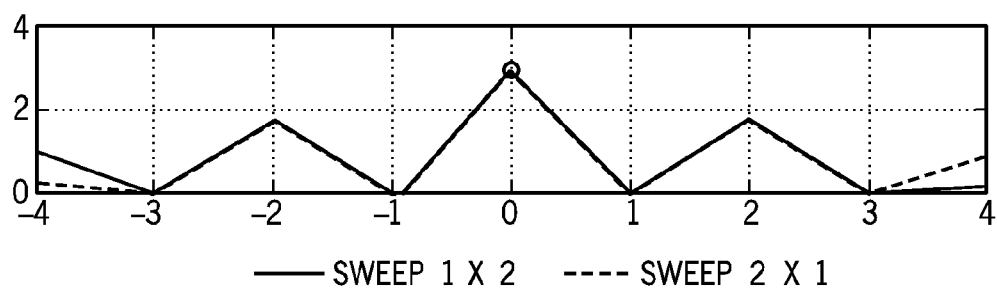
Figure 10F:
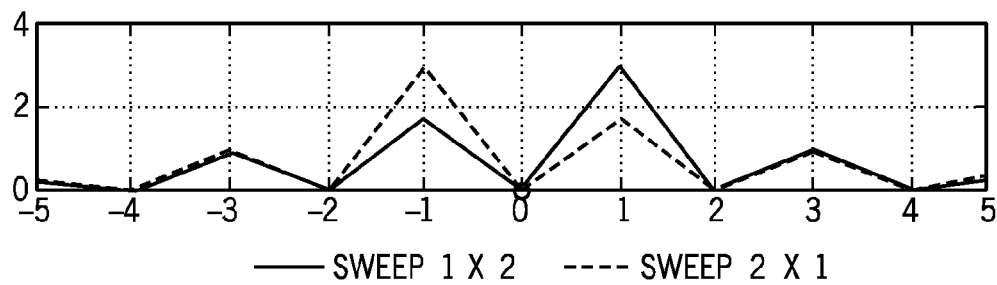

In contrast, FIGS. 10D-F show an embodiment of the invention. Specifically, FIG. 10D shows sweeps 1 and 2. When sweeps 1 and 2 begin at the same time they have a cross-correlation value at t=0 of 3 (FIG. 10E). However, when they start 1 second apart the cross correlation value at t=0 is 0 (FIG. 10F).

Figure 4A:
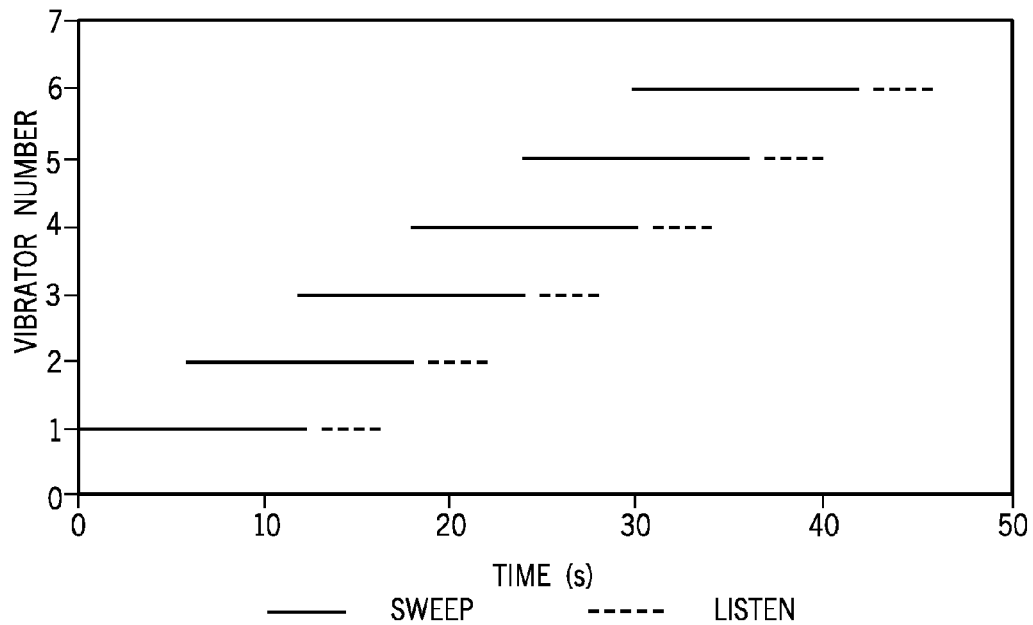
FIGS. 4A-B include embodiments for crosscorrelation noise maximization.
Figure 4B:
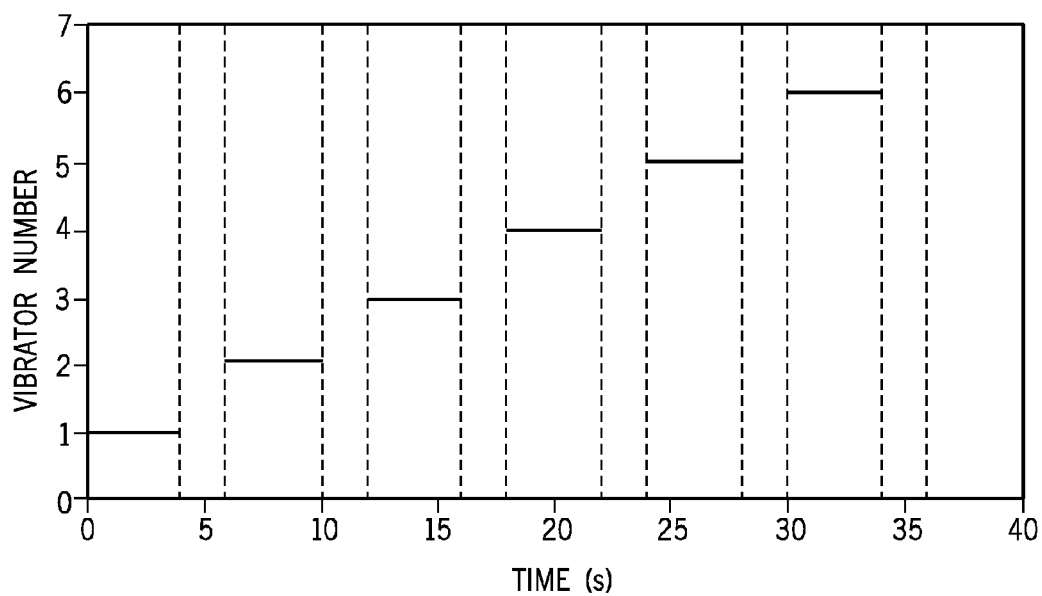

The example sweeps of, for example, FIGS. 3A-B and 10A-F define a window of minimized cross-correlation noise. However, in some embodiments a window of cross-correlation noise maximization (instead of or in addition to) cross-correlation noise minimization is designed. For example, FIGS. 4A-B include an embodiment of the invention with a window of cross-correlation noise maximization. FIG. 4A includes uncorrelated data for a slip-sweep style acquisition technique where a source (or group of sources) sweeps without waiting for the previous source's sweep to end. In this embodiment a sequence of pseudorandom sweeps were designed to maximize or concentrate cross-correlation noise in the gaps between sweeps. These gaps are located between the hashed lines in FIG. 4B, which includes correlated records for the sweeps included in FIG. 4A. In FIGS. 4A-B the "gaps" in the correlated data (FIG. 4B) correspond to periods in the uncorrelated data (FIG. 4A) that include sweeping time for multiple sweeps but that avoid listening time for any of the sweeps. For example, the gap between t=10 and t=12 in the correlated data coincides with uncorrelated data showing vibrators 1 and 2 both conducting sweeping (but no listening). The gap ends at t=12, which coincides with the beginning of the listening period for vibrator 1.

In an embodiment of the invention, crosscorrelation noise may be steered (e.g., "away" from minimization windows or "into" maximization windows) using various techniques including, but not limited to, simulated annealing techniques (see, e.g., U.S. Patent Application Pub. No. 2009/0052278), and the like.

Figure 5:
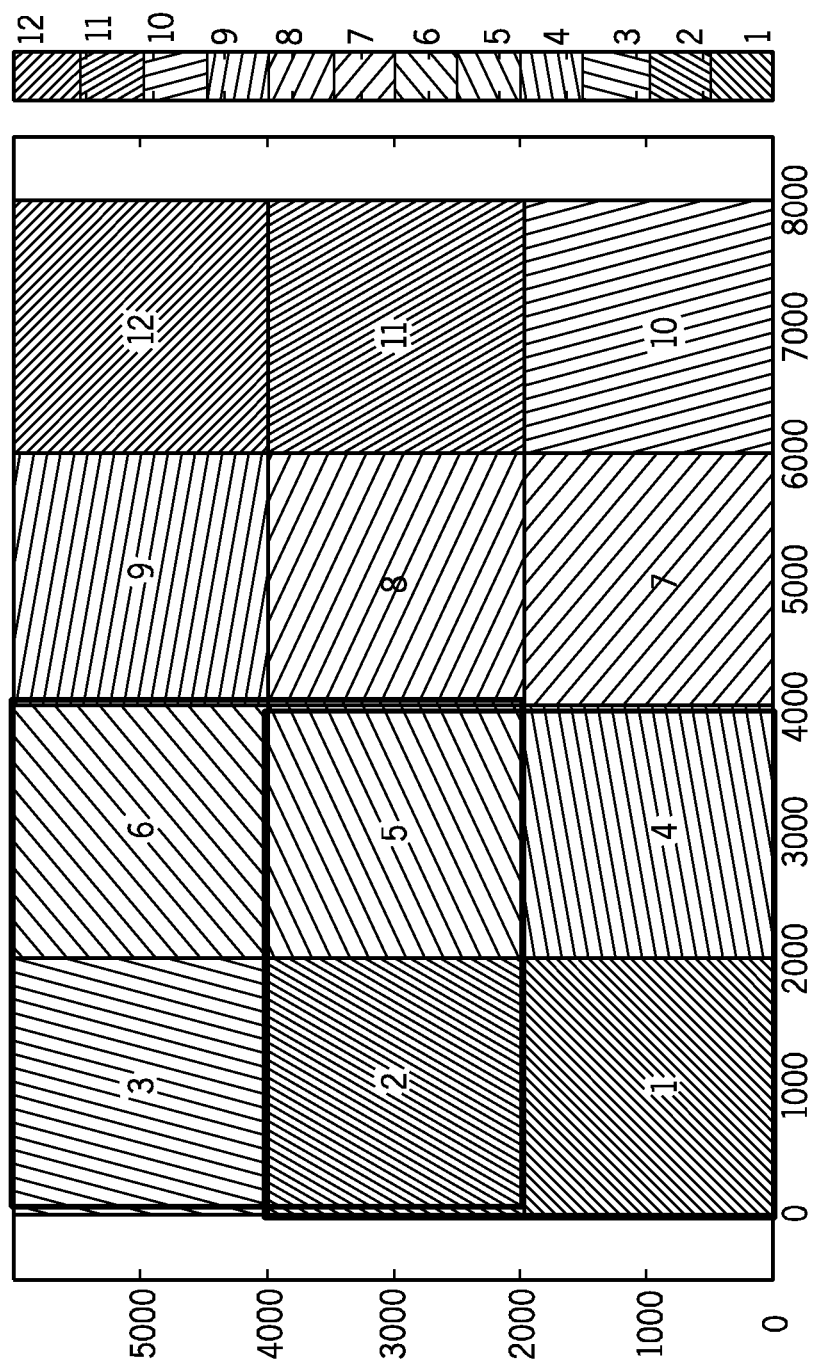
FIG. 5 includes a survey grid in an embodiment.

FIG. 5 includes a survey grid in an embodiment of the invention. The grid concerns a technique, such as an ISS technique (addressed further below) where the possible sweep start times are not constrained (e.g., are not strictly tied to one another). Specifically, vibrators are typically positioned over a large geographic area so significant interference is generally limited to vibrators in adjacent sectors to one another. For example, a vibrator in sector 1 of FIG. 5 is most significantly affected by vibrators in sectors 2, 4 and 5. Thus, to determine a sweep for a vibrator in sector 1 the user may consider the sweeps of vibrators in sectors 2, 4 and 5 but disregard vibrator sweeps in other sectors. The sweep may be selected from a preexisting matrix of possible pseudorandom sweeps that coordinate a proposed sweep with previously performed or presently performing sweeps in sectors deemed close enough to possibly interfere with results. In an embodiment, the sweep matrix need not attempt to minimize interference between all the vibrators but instead, only between those that are near enough to generate significant noise.

In an embodiment, noise reduction may be obtained by routing the vibrators in potentially troublesome sectors so the corresponding inter-source distance is maximized. In another embodiment, two sources (e.g., vibrators) may be assigned to each sector and then sweeps may be selected (or generated) to stop each pair from interfering with each other by enforcing a time delay (slip-sweep). However, the above embodiments regarding crosscorrelation window minimization/maximization may remove/lessen the need for such timing coordination/restraints.

FIG. 6 includes a schematic flow chart in an embodiment of the invention. Block 605 includes identification of the start time of a previous sweep(s) relative to the current sweep (starting at t=0) for vibrators close enough to generate a significant level of interference noise. For sweep 625 the previous sweep begin time (sweep 620), relative to the begin sweep time for sweep 625 is t=−7 (t=0 is based on current sweep 625) and for sweep 630 it is t=−3 (because sweep 625 is the sweep immediately preceding sweep 630).

In block 610 a time period for crosscorrelation noise concentration is determined. When the sources are operating independently (as is the case in an embodiment of the invention) one may not know when the next sweep(s) will occur. Thus, crosscorrelation noise minimization/maximization may be focused backwards towards times less than t=0. For example, for sweep 625 the previous sweep time (sweep 620) is t=−7.

To concentrate the cross-correlation noise between the current record (sweep 625) and the previous record (sweep 620) the prospective sweep "gap" (t_diff) or maximization window may be evaluated to determine if it is large enough to concentrate a significant level of cross-correlation noise (t_min). For example, |t_diff|−L>t_min where L is the listen-time. For sweep 625 this gives window limits of between t=−3 and t=0. For sweep 630 the range would be between t=−6 and t=−3.

If the 3 second gap is sufficient for noise concentration, in block 615 the appropriate sweep is selected from a range of sweeps (e.g., a matrix of sweeps) and transmitted into the ground (with sweeps that concentrate the crosscorrelation noise in the intersweep gap).

Even if it is not possible to concentrate the cross-correlation noise at times where there is no data of interest, embodiments can still ensure the majority of the cross-correlation noise appears where it will do less harm (e.g., at the beginning of the record where the signal is strongest) or ensure the noise is spread evenly between the records.

Figure 7:
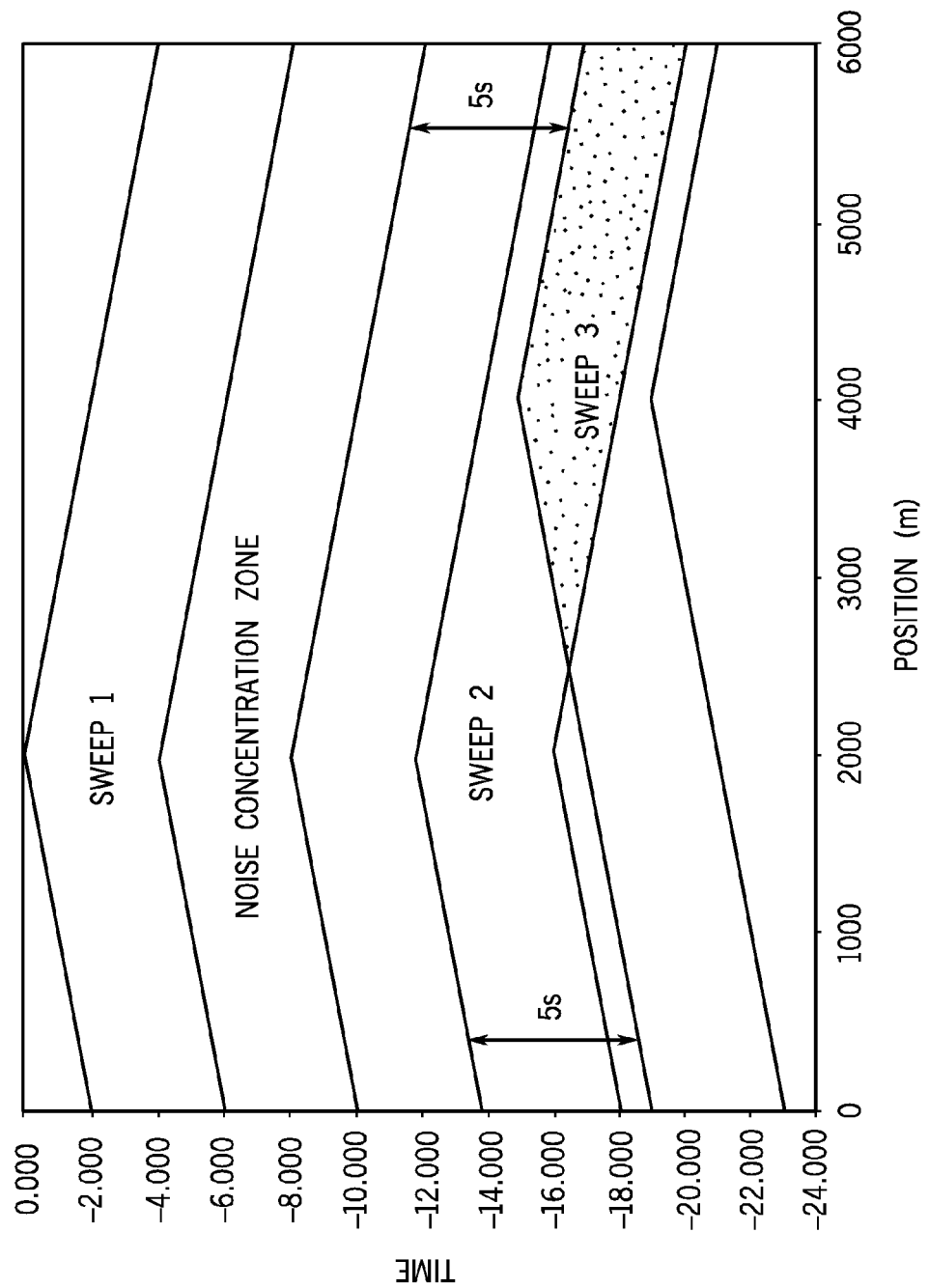
FIG. 7 includes a plot for identifying noise maximization windows in an embodiment.

Several of the descriptions above address situations where sources are close together relative to the velocity of the most energetic events (i.e., associated with the most interference noise). However, if the sources are further apart a "noise concentration zone" may be identified to help identify locations for noise concentration. FIG. 7 includes a plot for identifying noise maximization windows. The plot shows the areas of a t-x plot occupied by each of three sweeps. The second and third sweeps overlap, particularly on the high-side of the line (e.g., positions >~2,000 m). An embodiment calculates the time offset (t) between Sweeps 2 and 3 for such a scenario as follows: t=(t_sweep2−t_sweep1)+(x_sweep2−x_sweep1)/v where t_sweep and x_sweep are the times and positions of the two sweeps respectively and v is the velocity of the noise. For the example in FIG. 7 this yields t=(15−12)+(4000−2000)/1000=5 second difference. In other words, the noise should be concentrated approximate 5 seconds before Sweep 3. Consequently, the noise will not interfere with Sweep 2 at the "low side" (e.g., positions ~2,000 m) or the "high side" (e.g., positions >~2,000 m).

Figure 8:
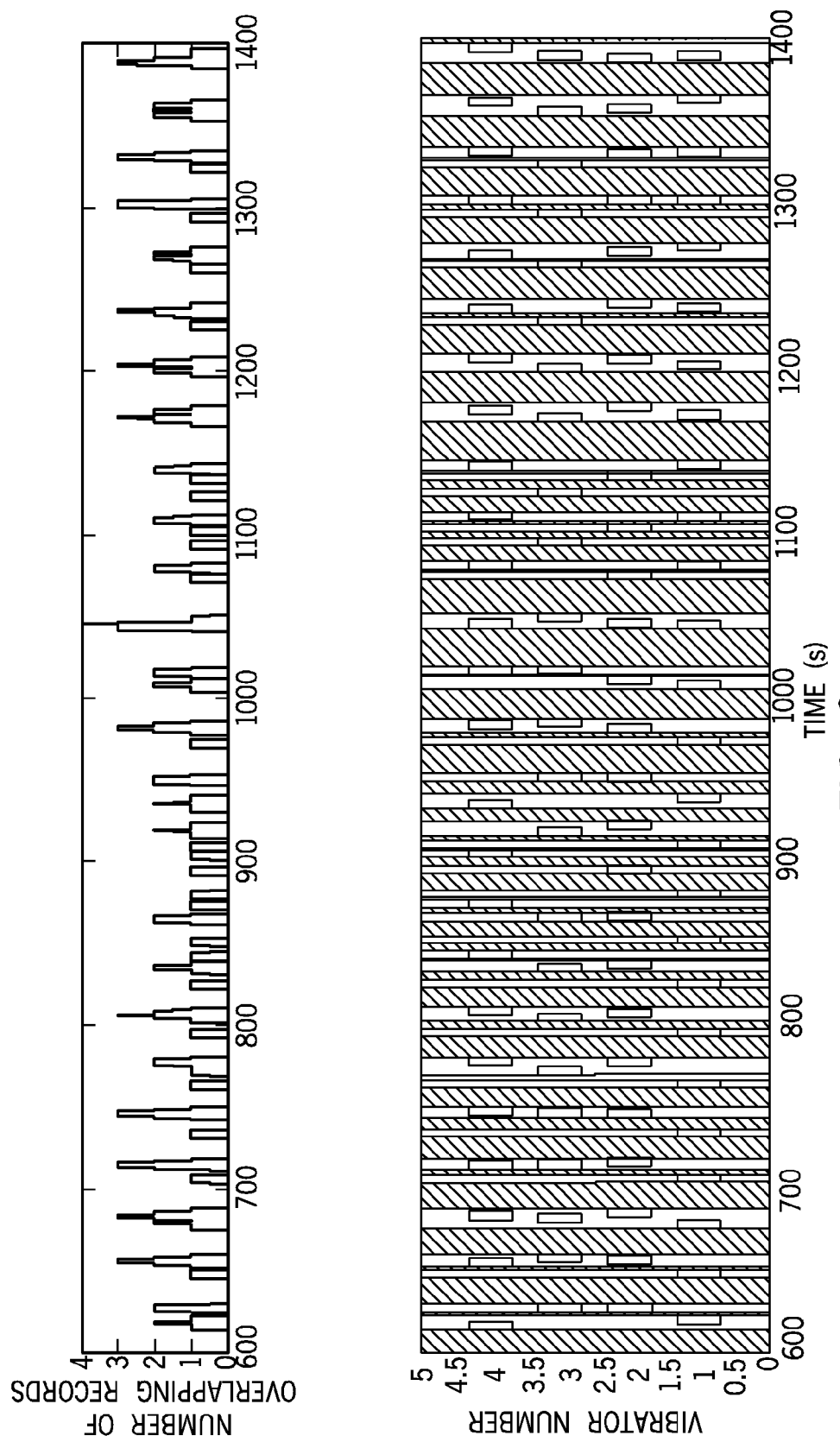
FIG. 8 includes results from a simulated survey in an embodiment.

FIG. 8 includes results from a simulated survey. Specifically, FIG. 8 shows results from a simulated ISS survey (i.e., where each vibrator is assigned an area of points to acquire, which each vibrator then acquires independently—whenever it is ready while ignoring the behavior of the other vibrators) with an 18 second move-up time and a 5 second record length. In the lower plot the behavior of four of the vibrators is shown. The position of the resulting records for each source group are shown as the dark solid bars on the lower plot, with the more lightly shaded areas (which run from top to bottom across all four sources) indicating areas where the cross-correlation noise could be concentrated. The upper plot shows the number of vibrators sweeping at various points in time. Thus, the plots indicate there are many time periods (e.g., between sweeps) where cross-correlation noise can be concentrated.

In an embodiment, if a system identifies there is no appropriate time window available for concentrating the cross-correlation noise then the system could choose to delay subsequent sweeps to make such windows available Thus, several embodiments of the invention are described above.

For example, as discussed with regard to FIGS. 3A-B and 10A-F, an embodiment determines a drive signal that suppresses cross-correlation noise between the first sweep and a second sweep in a suppression window offset from a listening time for the first sweep. In FIGS. 3A-B, the window was offset from t=0 for sweep 1 by sliding the concentration window to the right of the sweep 1 t=0 location. Also, a suppression window was offset from t=0 for sweep 2 by sliding the window to the left of the t=0 location for sweep 2. In the example of FIGS. 3A-B, the first and second sweeps overlap but begin at different times.

Embodiments may include modifying or manipulating pseudorandom sequences to generate the drive signals that drive the seismic sources (e.g., vibrators).

The drive signals may focus on maximization windows instead of or in addition to minimization windows. The drive signal may maximize cross-correlation noise during a maximization window that includes sweeping time for both of the first and second sweeps and no listening time for either of the first and second sweeps (see, e.g., FIGS. 4A-B).

Some embodiments may determine whether a maximization window is long enough to include a majority of the cross-correlation noise. What constitutes a sufficient window may be defined using a threshold value such as, for example, 2, 3, 4, 5, 6, 7 or more seconds.

An embodiment may include generating or selecting a drive signal that maximizes cross-correlation noise during a maximization window existing between the first and second sweeps (see, e.g., FIGS. 4A-B, 6 and 8).

Embodiments may include selecting sweeps from a list, matrix, or assortment of sweep options. The drive signal may be selected based upon a second sweep that has already begun. For example, the drive signal may be based on the starting time for the second sweep.

Embodiments may include determining the first and second seismic sources are located within a proximity of one another that satisfies a threshold. (See, e.g., FIG. 5). Embodiments may include determining a drive signal based on starting times for the first and second sweeps and the distance between the first and second sources during the first and second sweeps (see, e.g., FIGS. 5, 6 and 7).

Embodiments are not limited to land-based seismic surveys. For example, the sweeps and sweep generation/selection processes described above may be used by a marine vibrator or vibrators in a marine environment. Thus, a "seismic source" as used herein is not limited to land-based sources but may also include, for example, marine-based sources used in marine-based seismic surveys.

Figure 9:
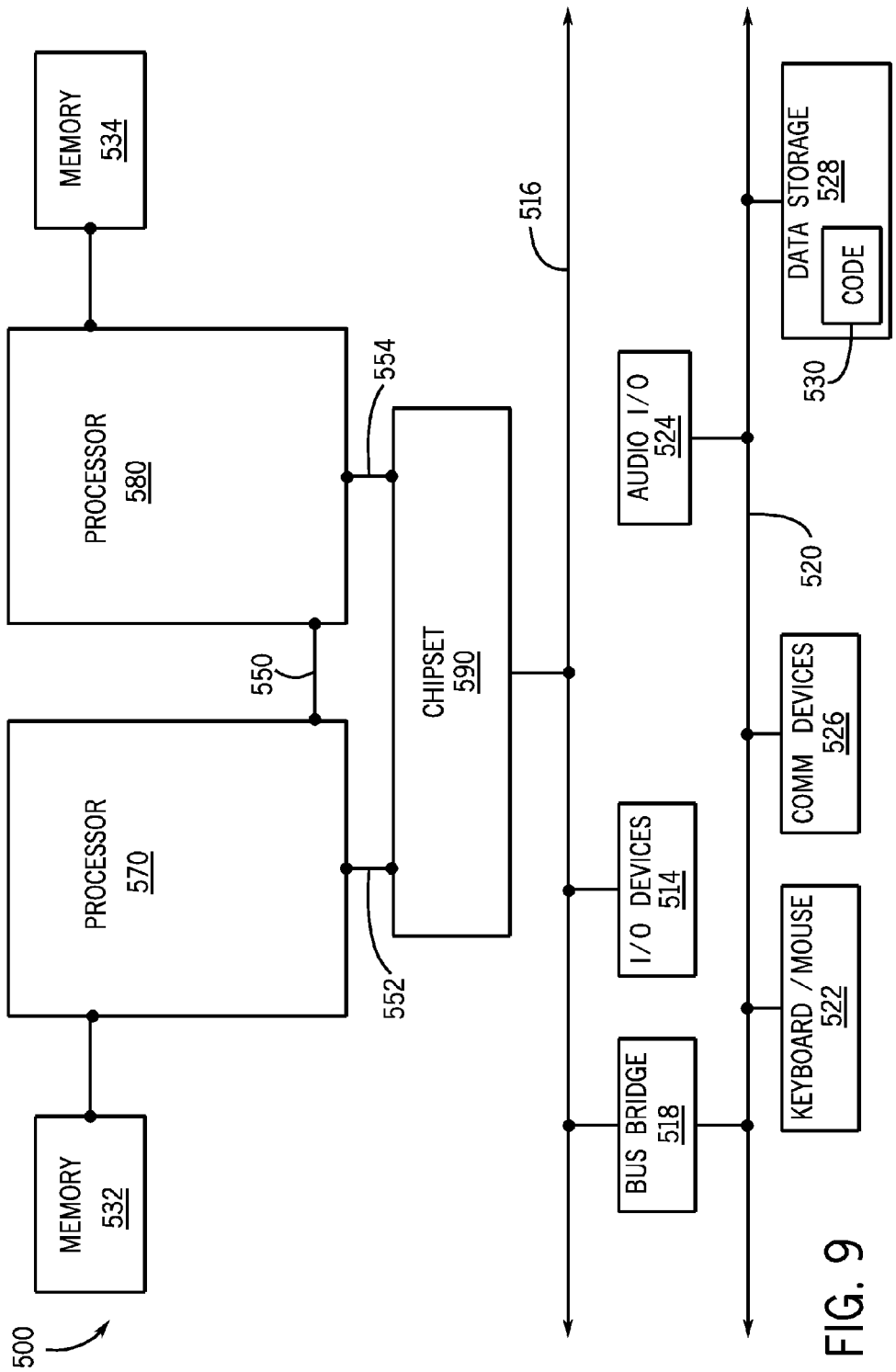
FIG. 9 includes a system for use with various embodiments.

Embodiments may be implemented in many different system types. Referring now to FIG. 9, shown is a block diagram of a system in accordance with an embodiment of the present invention. Multiprocessor system 500 is a point-to-point interconnect system, and includes a first processor 570 and a second processor 580 coupled via a point-to-point interconnect 550. Each of processors 570 and 580 may be multicore processors. The term "processor" may refer to any device or portion of a device that processes electronic data from registers and/or memory to transform that electronic data into other electronic data that may be stored in registers and/or memory. First processor 570 may include a memory controller hub (MCH) and point-to-point (P-P) interfaces. Similarly, second processor 580 may include a MCH and P-P interfaces. The MCHs may couple the processors to respective memories, namely memory 532 and memory 534, which may be portions of main memory (e.g., a dynamic random access memory (DRAM)) locally attached to the respective processors. First processor 570 and second processor 580 may be coupled to a chipset 590 via P-P interconnects, respectively. Chipset 590 may include P-P interfaces. Furthermore, chipset 590 may be coupled to a first bus 516 via an interface. Various input/output (I/O) devices 514 may be coupled to first bus 516, along with a bus bridge 518, which couples first bus 516 to a second bus 520. Various devices may be coupled to second bus 520 including, for example, a keyboard/mouse 522, communication devices 526, and data storage unit 528 such as a disk drive or other mass storage device, which may include code 530, in one embodiment. Further, an audio I/O 524 may be coupled to second bus 520.

Embodiments may be implemented in code and may be stored on a non-transitory storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions. Embodiments of the invention may be described herein with reference to data such as instructions, functions, procedures, data structures, application programs, configuration settings, code, and the like. When the data is accessed by a machine, the machine may respond by performing tasks, defining abstract data types, establishing low-level hardware contexts, and/or performing other operations, as described in greater detail herein. The data may be stored in volatile and/or non-volatile data storage. The terms "code" or "program" cover a broad range of components and constructs, including applications, drivers, processes, routines, methods, modules, and subprograms and may refer to any collection of instructions which, when executed by a processing system, performs a desired operation or operations. In addition, alternative embodiments may include processes that use fewer than all of the disclosed operations, processes that use additional operations, processes that use the same operations in a different sequence, and processes in which the individual operations disclosed herein are combined, subdivided, or otherwise altered. Components or modules may be combined or separated as desired, and may be positioned in one or more portions of a device.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   determining a first drive signal to generate a first sweep for a first seismic source and to suppress cross-correlation noise between the first sweep and a second sweep in a suppression window offset from a listening time for the first sweep; and
   determining the first drive signal based on (a) subsurface velocities corresponding to the first and second sweeps, (b) starting times corresponding to the first and second sweeps, and (c) a distance between the first and second sources during the first and second sweeps;
   wherein the first and second sweeps overlap but begin at different times and the second sweep corresponds to a second seismic source.

2. The method of claim 1 including modifying a pseudo-random sequence to generate the first drive signal.

3. The method of claim 2 including modifying the pseudo-random sequence to generate the first drive signal to maximize the cross-correlation noise during a maximization window that includes sweeping time for both of the first and second sweeps and no listening time for either of the first and second sweeps.

4. The method of claim 3 including determining the maximization window is long enough to include a majority of the cross-correlation noise.

5. The method of claim 2 including modifying the pseudo-random sequence to generate the first drive signal to maximize the cross-correlation noise during a maximization window existing between the first and second sweeps.

6. The method of claim 1 including determining the first drive signal after the second sweep has already begun.

7. The method of claim 6 including determining the first drive signal based on the starting time for the second sweep.

8. The method of claim 6 including determining the first and second seismic sources are located within a proximity of one another that satisfies a threshold.

9. The method of claim 1 including determining the first drive signal based on selecting the first drive signal from a collection of previously generated drive signals.

10. An article comprising at least one non-transitory medium storing instructions that enable a processor based system to:
    determine a first drive signal to generate a first sweep for a first seismic source and to suppress cross-correlation noise between the first sweep and a second sweep in a suppression window offset from a listening time for the first sweep; and
    determine the first drive signal based on (a) subsurface velocities corresponding to the first and second sweeps, (b) starting times corresponding to the first and second sweeps, and (c) a distance between the first and second sources during the first and second sweeps;
    wherein the first and second sweeps are to overlap but begin at different times and the second sweep corresponds to a second seismic source.

11. The article of claim 10 storing instructions that enable the system to generate the first drive signal to maximize the cross-correlation noise during a maximization window that includes sweeping time for both of the first and second sweeps and no listening time for either of the first and second sweeps.

12. The article of claim 10 storing instructions that enable the system to generate the first drive signal to maximize the cross-correlation noise during a maximization window existing between the first and second sweeps.

13. The article of claim 10 storing instructions that enable the system to determine the first drive signal after the second sweep has already begun.

14. The article of claim 10 storing instructions that enable the system to determine the first drive signal based on the starting time for the second sweep.

15. An article comprising at least one non-transitory medium storing instructions that enable a processor based system to:
    determine a first drive signal to generate a first sweep for a first seismic source and to maximize cross-correlation noise between the first sweep and a second sweep in a maximization window that includes no listening time for either of the first and second sweeps;
    store the first drive signal in the at least one non-transitory medium and communicate the first drive signal to the first seismic source;
    wherein the first and second sweeps are to overlap but begin at different times and the second sweep corresponds to a second seismic source.

16. The article of claim 15 storing instructions that enable the system to determine the first drive signal to suppress the cross-correlation noise in a suppression window offset from the listening time for the first sweep.

17. The article of claim 15 storing instructions that enable the system to determine the first drive signal after the second sweep has already begun.

18. The article of claim 15 storing instructions that enable the system to determine the first drive signal based on starting times for the first and second sweeps and the distance between the first and second sources during the first and second sweeps.

19. An article comprising at least one non-transitory medium storing instructions that enable a processor based system to:
- determine a first drive signal to generate a first sweep for a first seismic source and to suppress cross-correlation noise between the first sweep and a second sweep in a suppression window offset from a listening time for the first sweep; and
- generate the first drive signal to maximize the cross-correlation noise during a maximization window existing between the first and second sweeps;
- wherein the first and second sweeps are to overlap but begin at different times and the second sweep corresponds to a second seismic source.

20. The article of claim 19 storing instructions that enable the system to determine the first drive signal after the second sweep has already begun.

\* \* \* \* \*